US011641047B2

(12) United States Patent
Park et al.

(10) Patent No.: US 11,641,047 B2
(45) Date of Patent: May 2, 2023

(54) METHOD FOR MANUFACTURING CYLINDRICAL BATTERY HAVING MULTIPLE TABS AND CYLINDRICAL BATTERY MANUFACTURED USING THE SAME

(71) Applicant: LG CHEM, LTD., Seoul (KR)

(72) Inventors: Hyojin Park, Daejeon (KR); Joon Sung Bae, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/258,485

(22) PCT Filed: Jan. 2, 2020

(86) PCT No.: PCT/KR2020/000041
§ 371 (c)(1),
(2) Date: Jan. 7, 2021

(87) PCT Pub. No.: WO2020/141895
PCT Pub. Date: Jul. 9, 2020

(65) Prior Publication Data
US 2021/0159574 A1 May 27, 2021

(30) Foreign Application Priority Data
Jan. 2, 2019 (KR) .................. 10-2019-0000382

(51) Int. Cl.
*H01M 50/538* (2021.01)
*H01M 50/516* (2021.01)
(Continued)

(52) U.S. Cl.
CPC ......... *H01M 50/538* (2021.01); *H01M 10/04* (2013.01); *H01M 50/105* (2021.01);
(Continued)

(58) Field of Classification Search
CPC ............... H01M 10/058; H01M 10/04; H01M 10/0422; H01M 10/0431; H01M 10/045;
(Continued)

(56) References Cited

U.S. PATENT DOCUMENTS 6,071,638 A   6/2000  Fradin
8,956,743 B2  2/2015  Yang et al.
(Continued)

FOREIGN PATENT DOCUMENTS

CN   209104251   *  7/2019  ........ H01M 10/4235
JP   10-83805 A      3/1998
(Continued)

OTHER PUBLICATIONS

International Search Report issued in PCT/KR2020/000041 (PCT/ISA/210), dated Apr. 21, 2020.
(Continued)

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

A method for manufacturing a cylindrical battery having multiple tabs is provided in which the cylindrical battery includes an electrode assembly, a cylindrical pouch case, an electrode tab protruding to an upper end of the electrode assembly, and an electrode lead welded and electrically connected to the electrode tab, with the electrode tab being plural. The method includes disposing the plurality of electrode tabs on the electrode assembly; winding the electrode assembly into a cylindrical shape; connecting the electrode lead to the plurality of electrode tabs disposed on the upper end of the electrode assembly; inserting the electrode assembly into the cylindrical pouch case to produce a battery cell; connecting, to the cylindrical pouch case, a gas collecting
(Continued)

part for collecting gas generated due to charging and discharging of the electrode; and forming a guide part for preventing deformation of the battery cell in the cylindrical pouch case.

11 Claims, 12 Drawing Sheets

(51) Int. Cl.
*H01M 50/105* (2021.01)
*H01M 50/536* (2021.01)
*H01M 50/317* (2021.01)
*H01M 10/04* (2006.01)
*H01M 50/533* (2021.01)

(52) U.S. Cl.
CPC ....... *H01M 50/317* (2021.01); *H01M 50/516* (2021.01); *H01M 50/533* (2021.01); *H01M 50/536* (2021.01)

(58) Field of Classification Search
CPC .... H01M 10/049; H01M 10/12; H01M 10/28; H01M 10/38; H01M 10/4235; H01M 10/52; H01M 50/107; H01M 50/308; H01M 50/317; H01M 50/531; H01M 50/533; H01M 50/534; H01M 50/536; H01M 50/538; Y02P 70/50
See application file for complete search history.

(56) References Cited

U.S. PATENT DOCUMENTS

| | | | |
|---|---|---|---|
| 2011/0274953 A1* | 11/2011 | Hato | ............... H01M 50/538 429/94 |
| 2012/0321923 A1 | 12/2012 | Yun | |
| 2016/0079579 A1 | 3/2016 | Jung | |
| 2020/0235369 A1* | 7/2020 | Jeong | ............... H01M 50/172 |
| 2021/0265709 A1* | 8/2021 | Xu | ............... H01M 50/50 |

FOREIGN PATENT DOCUMENTS

| | | |
|---|---|---|
| JP | 11-312510 A | 11/1999 |
| JP | 11-312532 A | 11/1999 |
| KR | 10-2006-0037827 A | 5/2006 |
| KR | 10-2007-0097852 A | 10/2007 |
| KR | 10-2008-0019551 A | 3/2008 |
| KR | 10-2012-0029320 A | 3/2012 |
| KR | 10-2016-0032590 A | 3/2016 |
| KR | 10-2016-0101347 A | 8/2016 |
| KR | 10-2017-0043926 A | 4/2017 |
| KR | 10-2017-0132565 A1 | 12/2017 |
| KR | 10-2018-0031160 A | 3/2018 |
| WO | WO 2010/062037 A2 | 6/2010 |

OTHER PUBLICATIONS

Extended European Search Report for European Application No. 20735854.0, dated Jun. 17, 2021.

* cited by examiner

METHOD FOR MANUFACTURING CYLINDRICAL BATTERY HAVING MULTIPLE TABS AND CYLINDRICAL BATTERY MANUFACTURED USING THE SAME

CROSS CITATION WITH RELATED APPLICATION(S)

This application claims the benefit of Korean Patent Application No. 10-2019-0000382 filed on Jan. 2, 2019 with the Korean Intellectual Property Office, the disclosure of which is incorporated herein by reference in its entirety.

TECHNICAL FIELD

The present disclosure relates to a method for manufacturing a cylindrical battery having multiple tabs and a cylindrical battery manufactured using the same, and more particularly, to a method for manufacturing a cylindrical battery having multiple tabs capable of preventing deformation of a battery cell due to gas generated during charging and discharging of the battery, and a cylindrical battery manufactured using the same.

BACKGROUND ART

In modern society, as portable devices such as a mobile phone, a notebook computer, a camcorder and a digital camera has been daily used, the development of technologies in the fields related to mobile devices as described above has been activated. There is an increasing need for development of the secondary battery used in the portable devices.

The secondary battery includes a nickel-cadmium battery, a nickel-hydrogen battery, a nickel-zinc battery, a lithium secondary battery, etc. Among them, the lithium secondary battery is rechargeable and capable of being miniaturized and of having a large capacity, and is widely used in various fields due to its high power capacity and long life. However, in the case of the lithium secondary battery, there is a disadvantage that there is a risk of explosion due to the characteristic of lithium, which is an unstable element.

The explosion of the lithium secondary battery is caused by various causes, one of which is an increase in gas pressure inside the secondary battery. Specifically, when the electrode is in the state of overcharge, over-discharge, short circuit or overcurrent, gas is generated inside the secondary battery due to heat generation or ignition of the electrode. While the inside of the secondary battery is swollen due to the gas thus generated, an explosion of the secondary battery is caused. In addition, a swelling phenomenon may occur in which the electrode assembly expands while changing the volume of the active material by the charging and discharging of the battery. Such swelling phenomenon occurs while the vicinity of the center of the short side of the battery can is contracted inward, and the center of the long side is excessively swollen outward.

In particular, in a conventional cylindrical battery, the battery cell is disposed inside the case of a rigid structure, and when the battery cell disposed therein expands to cause the swelling phenomenon, there was a problem that it is not easy to remove the generated gas from the inside, and thus, it is difficult to lower the internal pressure.

In addition, in the case of the conventional cylindrical battery, when an electrode lead is welded to the outer case, there was a problem that one electrode lead for each of the positive electrode and the negative electrode must be connected to the electrode (foil), resulting an increase in resistance.

In order to solve the problems occurring in the cylindrical battery, there is a need to develop a method for manufacturing a cylindrical battery having multiple tabs, which lower the resistance in the process of connecting the electrode, while preventing deformation of the battery cell due to gas generated during charging and discharging of the battery.

DETAILED DESCRIPTION OF THE INVENTION

Technical Problem

Embodiments of the present disclosure are proposed to solve the above-mentioned problems of the methods proposed in the prior arts, and, therefore, it is an object of the present disclosure to provide a method for manufacturing a cylindrical battery having multiple tabs, which can solve the conventional problems that the battery cell expands due to a swelling phenomenon and that the resistance increases in the process of electrode connection, and a cylindrical battery manufactured using the same.

However, the problem to be solved by the embodiments of the present disclosure is not limited to the above-described problems, and can be variously expanded within the scope of the technical idea included in the present disclosure.

Technical Solution

According to a feature of the present disclosure for achieving the above object, there is provided a method for manufacturing a cylindrical battery having multiple tabs, the cylindrical battery including an electrode assembly, a cylindrical pouch case, a plurality of electrode tabs protruding at an upper end of the electrode assembly to provide the multiple tabs, and an electrode lead welded and electrically connected to the electrode tab, the method comprising the steps of: disposing the plurality of electrode tabs on the electrode assembly such that the plurality of electrode tabs protrude at the upper end of the electrode assembly; winding the electrode assembly to form the electrode assembly into a cylindrical shape; connecting the electrode lead to the plurality of electrode tabs disposed on the upper end of the electrode assembly; inserting the electrode assembly into the cylindrical pouch case to produce a battery cell; connecting, to the cylindrical pouch case, a gas collecting part for collecting gas generated due to charging and discharging of the electrode assembly; and forming a guide part in the cylindrical pouch case for preventing deformation of the battery cell.

The plurality of electrode tabs may be disposed on at least one of an uncoated portion and a coated portion of the electrode assembly.

The guide part may be disposed on a straight line along a longitudinal direction of the cylindrical pouch case.

The guide part may be disposed on each of an upper end and a lower end of the cylindrical pouch case.

The gas collecting part may include a sealing part for sealing the gas collected in the gas collecting part.

The gas collecting part may be separated from the cylindrical pouch case in parallel with the sealing part.

The sealing part may have a dual sealing structure.

In the step of winding the electrode assembly to form the electrode assembly into the cylindrical shape, the plurality of electrode tabs may be disposed in a circular shape on the upper end of the cylindrical battery.

The lower end of the electrode lead connected to the plurality of electrode tabs has a circular shape and is disposed along an inner circumference of the plurality of electrode tabs disposed in the circular shape; and portions of the lower end of the electrode lead making contact with the plurality of electrode tabs may be welded to the plurality of electrode tabs.

The lower end of the electrode lead having the circular shape can be prepared in which two electrode lead portions are disposed vertically and horizontally, respectively, to cross each other, and the two lead portions are welded at a crossed portion, and then the electrode lead portion disposed horizontally at the lower end may be bent so that the lower end of the electrode lead has the circular shape.

The lower end of the electrode lead having a circular shape can be prepared in which two electrode lead portions are integrally formed vertically and horizontally, respectively, and then the electrode lead portion disposed horizontally at the lower end may be bent so that the lower end of the electrode lead has the circular shape.

In addition, according to another feature of the present disclosure for achieving the above object, a cylindrical battery includes an electrode assembly, a cylindrical pouch case, a plurality of electrode tabs protruding at an upper end of the electrode assembly, and an electrode lead welded and electrically connected to the plurality of electrode tabs, and the cylindrical battery can be manufactured by the method described above.

In addition, according to yet another feature of the present disclosure for achieving the above object, a cylindrical battery having multiple tabs may include an electrode assembly wound into a cylindrical shape, a plurality of electrode tabs protruding at an upper end of the electrode assembly to provide the multiple tabs, an electrode lead welded and electrically connected to the plurality of electrode tabs, and a cylindrical pouch case, the pouch case having a guide part connectable to a gas collecting part for preventing deformation of the battery cell.

The plurality of electrode tabs may be disposed in a circular shape on the upper end of the cylindrical battery.

A lower end of the electrode lead connected to the plurality of electrode tabs may have a circular shape and may be disposed along an inner circumference of the plurality of electrode tabs disposed in the circular shape. Portions of the lower end of the electrode lead making contact with the plurality of electrode tabs may be welded to the plurality of electrode tabs.

Advantageous Effects

According to a manufacturing method of a cylindrical battery having multiple tabs designed in the present disclosure, the resistance generated in the process of connecting the electrode can be lowered compared to the prior art, and the gas generated in the process of charging and discharging can be removed outside the cylindrical pouch case, thereby solving conventional problems such as an increase in internal pressure when a swelling phenomenon occurs.

DETAILED DESCRIPTION OF THE EMBODIMENTS

Figure 1:
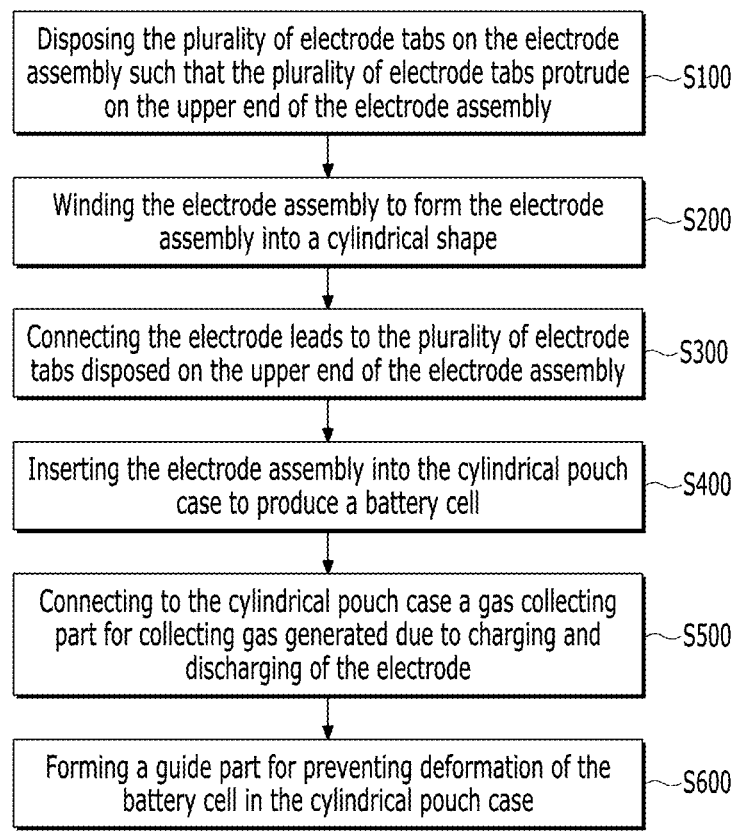
FIG. 1 is a flowchart showing a method for manufacturing a cylindrical battery having multiple tabs according to one embodiment of the present disclosure.

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element and intervening elements may also be present. In contrast, when an element is referred to as being "directly on" another element, it means that other intervening elements are not present. Further, the word "on" or "above" means disposed on or below a reference portion, and does not necessarily mean being disposed on the upper side of the reference portion toward the opposite direction of gravity.

Further, throughout the specification, when a part is referred to as "including" a certain component, it means that it can further include other components, without excluding the other components, unless otherwise stated.

FIG. 1 is a flowchart showing a method for manufacturing a cylindrical battery having multiple tabs according to one embodiment of the present disclosure.

As shown in FIG. 1, a method for manufacturing a cylindrical battery having multiple tabs according to one embodiment of the present disclosure is a method of manufacturing a cylindrical battery including an electrode assembly, a cylindrical pouch case, an electrode tab protruding to an upper end of the electrode assembly, and an electrode lead welded and electrically connected to the electrode tab, with the electrode tab being plural, the method comprising the steps of: disposing the plurality of electrode tabs on the electrode assembly such that the plurality of electrode tabs protrude on the upper end of the electrode assembly (S100); winding the electrode assembly to form the electrode assembly into a cylindrical shape (S200); connecting the electrode leads to the plurality of electrode tabs disposed on the upper end of the electrode assembly (S300); inserting the electrode assembly into the cylindrical pouch case to produce a battery cell (S400); connecting, to the cylindrical pouch case, a gas collecting part for collecting gas generated due to charging and discharging of the electrode (S500); and forming a guide part for preventing deformation of the battery cell on an outer surface of the cylindrical pouch case (S600).

Figure 2:
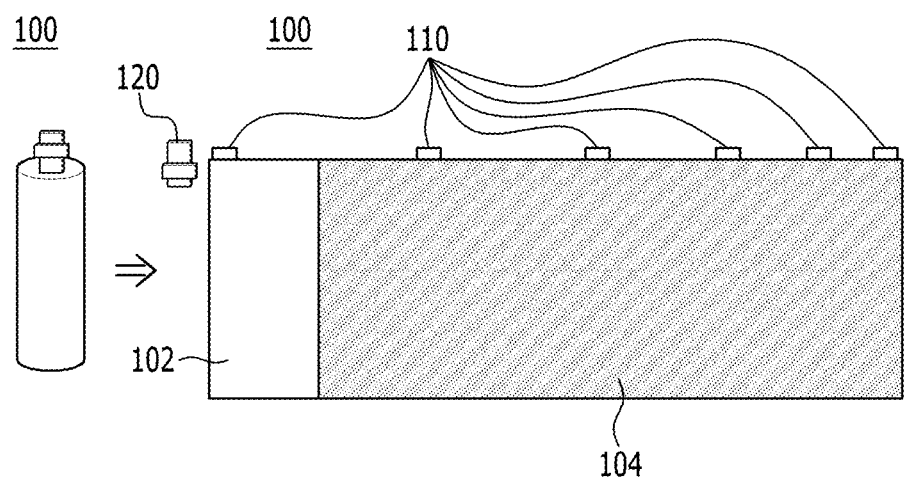
FIG. 2 is a view illustrating a step of disposing a plurality of electrode tabs according to one embodiment of the present disclosure.

FIG. 2 is a view illustrating a step of disposing a plurality of electrode tabs according to one embodiment of the present disclosure.

As shown in FIG. 2, in the step (S100) of disposing the plurality of electrode tabs 110 according to one embodiment of the present disclosure, the plurality of electrode tabs 110 may be disposed on an uncoated portion 102 and a coated portion 104. That is, the plurality of electrode tabs 110 may be disposed on at least one of the uncoated portion and the coated portion of the electrode assembly 100.

An electrode lead 120 may be welded and connected to the upper portions of the electrode tabs 110 disposed so that the upper end protrudes from the electrode assembly 100 in this way.

The present disclosure is directed to a cylindrical battery, and thus, the electrode assembly 100 may be wound to form the electrode assembly 100 into a cylindrical shape as shown in FIG. 2. When winding the electrode assembly 100 in this way, the plurality of electrode tabs 110 disposed in the electrode assembly 100 may be disposed so as to form a circular shape. This will be described in detail with reference to FIG. 3.

Figure 3:
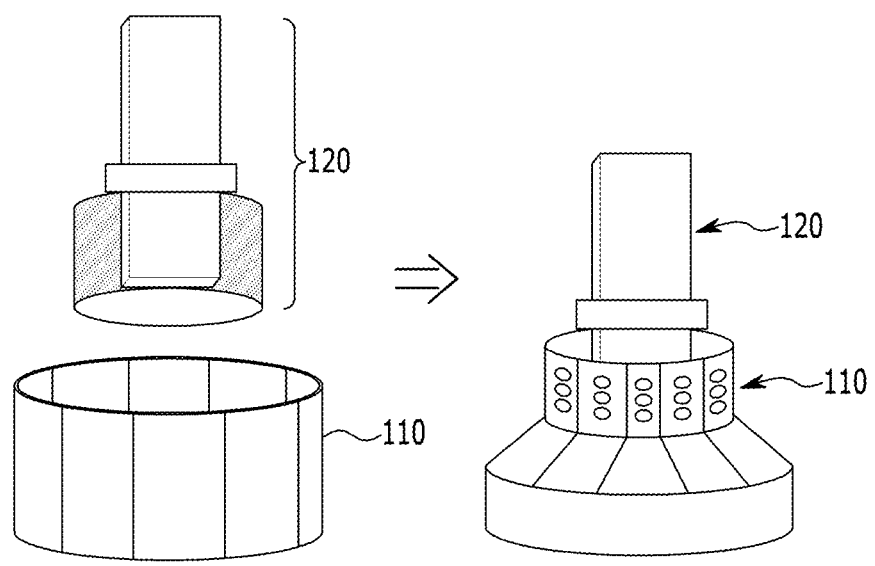
FIG. 3 is a view illustrating a step of connecting an electrode lead to a plurality of electrode tabs according to one embodiment of the present disclosure.

FIG. 3 is a view illustrating a step of connecting an electrode lead to the plurality of electrode tabs according to one embodiment of the present disclosure.

As shown in FIG. 3, in the method of manufacturing a cylindrical battery having multiple tabs according to one embodiment of the present disclosure, when the step (S200) of winding the electrode assembly 100 to form the electrode assembly 100 into a cylindrical shape is performed, the plurality of electrode tabs 110 disposed to protrude on the upper end of the electrode assembly 100 may be disposed to form a circular shape at the upper end of the cylindrical battery as shown in FIG. 3.

An electrode lead 120 is connected to the plurality of electrode tabs 110 disposed to form a circular shape as described above. According to an embodiment of the present disclosure, in order that the electrode lead 120 overlaps the plurality of electrode tabs 110 disposed into a circular shape, a shape of the lower end of the electrode lead 120, which is a portion making contact with the electrode tab 110, may have a circular shape as shown in FIG. 3. As a result, as the lower end of the electrode lead 120 forming a circular shape are disposed along an inner circumference of the plurality of electrode tabs 110 forming a circular shape, the portions making contact with the electrode tabs 110 and the electrode lead 120 may be welded and connected so as to overlap each other as shown in FIG. 3. By welding such that they overlap each other, the joint efficiency between the components can be improved, and the bonding strength can be increased to enhance the fixing force between the electrode tabs 110 and the electrode lead 120.

For the welding as shown in FIG. 3, the lower end of the electrode lead 120 of the present disclosure should have a circular shape. This, the process of preparing the electrode lead 120 having a circular lower end will be described with reference to FIGS. 4 and 5 below.

Figure 4:
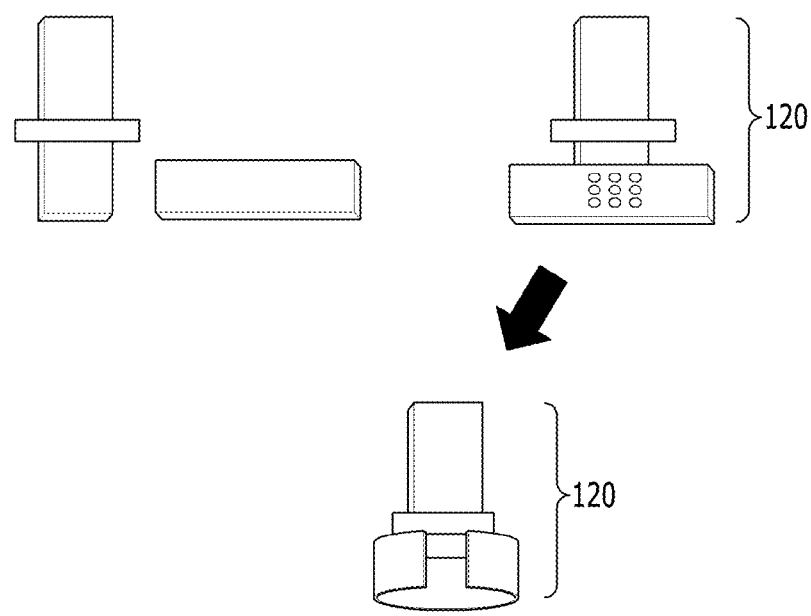
FIG. 4 is a view illustrating a process in which a lower end of an electrode lead according to one embodiment of the present disclosure is made into a circular shape.
Figure 5:
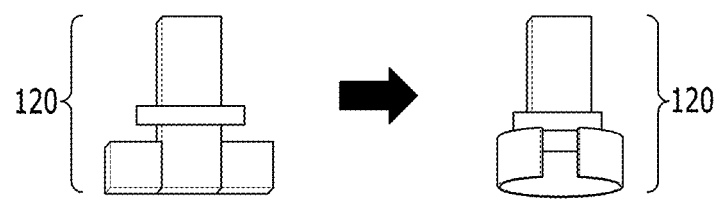
FIG. 5 is a view illustrating a process in which a lower end of an electrode lead according to another embodiment of the present disclosure is made into a circular shape.

FIG. 4 is a view illustrating a process in which the lower end of the electrode lead according to one embodiment of the present disclosure is made into a circular shape, and FIG. 5 is a view illustrating a process in which the lower end of the electrode lead according to another embodiment of the present disclosure is made into a circular shape.

The lower end of the electrode lead 120 having a circular shape can be prepared as shown in FIG. 4 as one embodiment, in which the two electrode lead portions are disposed vertically and horizontally to cross each other, respectively, and the crossed portion is welded as shown in FIG. 4, and then the electrode lead 120 disposed horizontally at the lower end may be bent so that the lower end of the electrode lead 120 form a circular shape. As shown in FIG. 5 as another embodiment, the two electrode lead portions are integrally formed vertically and horizontally, respectively, and then the electrode lead 120 disposed horizontally at the lower end may be bent so that the lower end of the electrode lead 120 form a circular shape.

Figure 6:
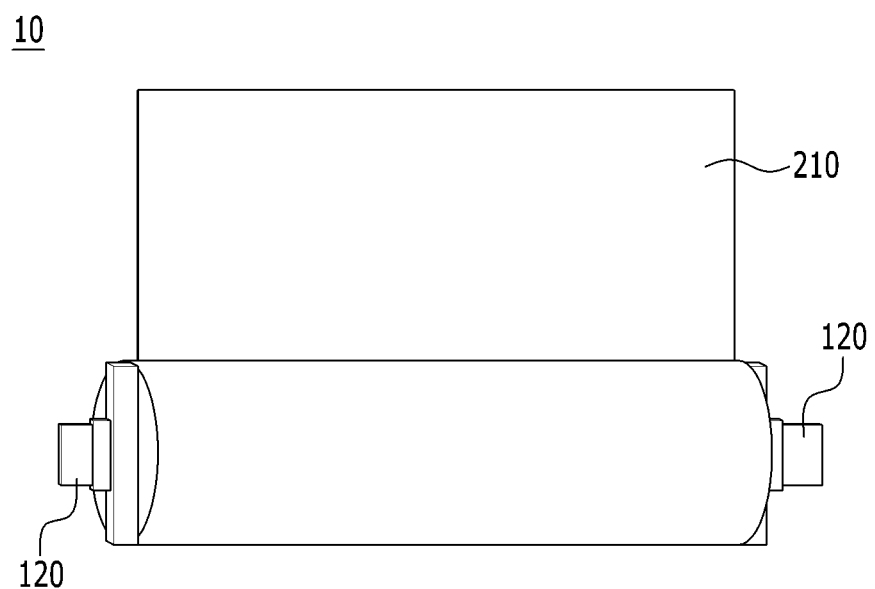
FIG. 6 is a view showing a state in which a gas collecting part according to one embodiment of the present disclosure is connected to a cylindrical pouch case.

FIG. 6 is a view showing a state in which a gas collecting part according to one embodiment of the present disclosure is connected to a cylindrical pouch case.

As shown in FIG. 6, in the cylindrical battery 10 of the present disclosure, a gas collecting part 210 for collecting gas generated due to charging and discharging of the electrodes may be connected to a cylindrical pouch case. In the case of the cylindrical battery 10, the gas collecting part 210 is connected as in FIG. 6; however, even when the gas collecting part 210 is connected in this way, there is a problem that along with the progress of the charging and discharging, gas is generated to expand the electrode, which finally causes deformation of the battery cell occurs.

In the present disclosure, in order to prevent deformation of the battery cell due to such electrode expansion, a guide part 200 may be formed on an outer surface of the cylindrical pouch case.

Figure 7:
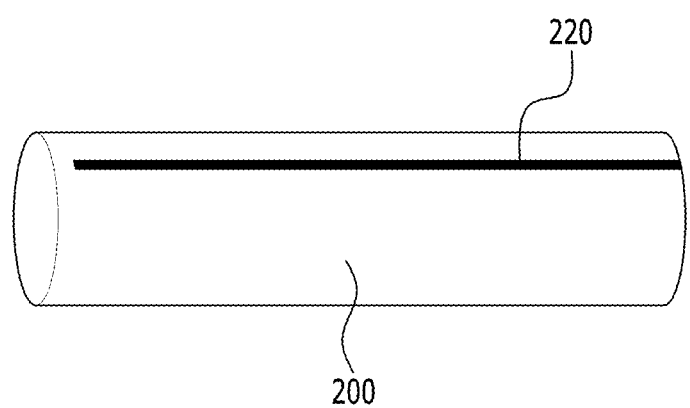
FIG. 7 is a view showing a state in which a guide part according to one embodiment of the present disclosure is formed in a cylindrical pouch case.
Figure 8:
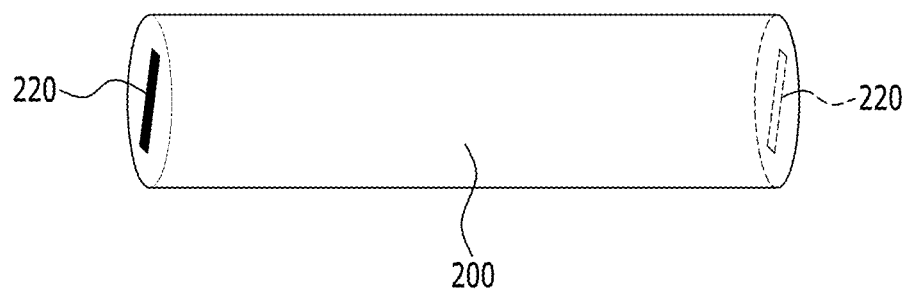
FIG. 8 is a view showing a state in which a guide part according to another embodiment of the present disclosure is formed on an outer surface of a cylindrical pouch case.

FIG. 7 is a view showing a state in which the guide part according to one embodiment of the present disclosure is formed on an outer surface of the cylindrical pouch case, and FIG. 8 is a view showing a state in which the guide part according to another embodiment of the present disclosure is formed in the cylindrical pouch case.

The guide part 200 in the present disclosure is for preventing a swelling phenomenon in which the center of the long side in the cylindrical pouch case is excessively swollen outward, and the vicinity of the center of the short side is contracted inward. According to one embodiment, as shown in FIG. 7, the guide part 200 is formed to correspond to the shape of the cylindrical pouch case, and the guide part 200 may include a slit 220 which is disposed side by side on a straight line along the long side of the guide part 200, that is, along the longitudinal direction; and according to another embodiment, the slit 220 may be further disposed on the short sides, i.e., the upper end and lower end of the guide part 200, respectively.

Further, according to an embodiment of the present disclosure, the gas collecting part 210 may be taken out through the slit 220 of the guide part 200. When gas is collected in the gas collecting part 210 taken out of the guide part 200 through the slit 220, the gas collecting part 210 and the battery cell are configured to be separated from each other, thereby preventing deformation of the battery cell caused by the charging and discharging. This will be described with reference to FIGS. 9 to 11.

Figure 9:
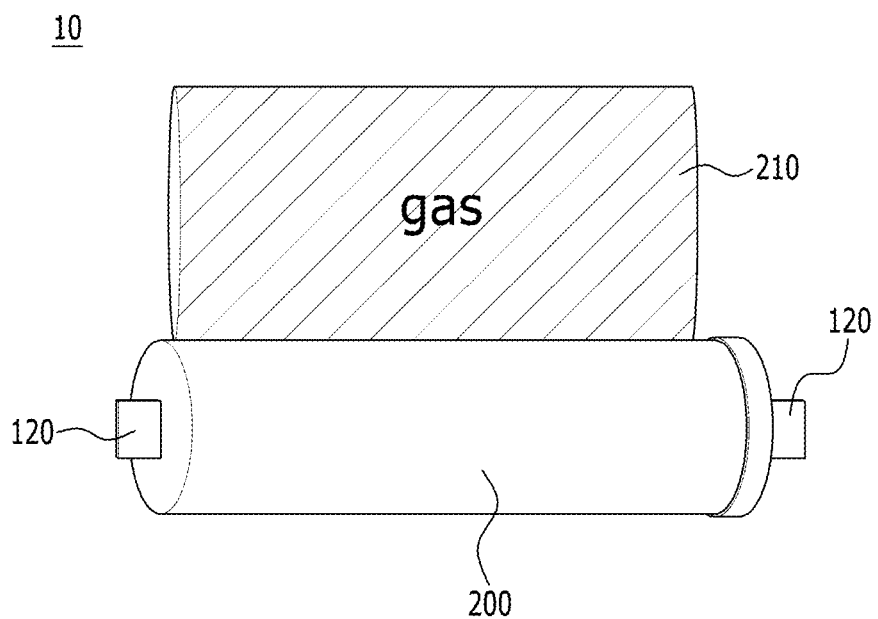
FIG. 9 is a view showing a state in which gas is collected in a gas collecting part according to one embodiment of the present disclosure.

FIG. 9 is a view showing a state in which gas is collected in the gas collecting part according to one embodiment of the present disclosure.

Specifically, FIG. 9 is a view showing a state in which gas is collected in the gas collecting part 210, with the gas collecting part 210 being taken out through the slit 220 disposed in a straight line along the longitudinal direction of the guide part 200. Due to the gas collecting part 210 separated through the slit 220, deformation of the battery cell can be prevented. In the case of the gas collecting part 210 which is not separated from the guide part 200 through the slit 220, there is a problem that the gases collected in the gas collecting part 210 are returned to the inside of the cylindrical pouch case again. Thus, in the present disclosure, the guide part 200 is to prevent the above-mentioned problems.

In addition, the gas collecting part 210 in the present disclosure may include a sealing part 212 for sealing the gas collected in the gas collecting part 210. That is, according to the embodiments, the sealing part 212 may be disposed to prevent the gas collected in the gas collecting part 210 from returning to the cylindrical pouch case again.

Figure 10:
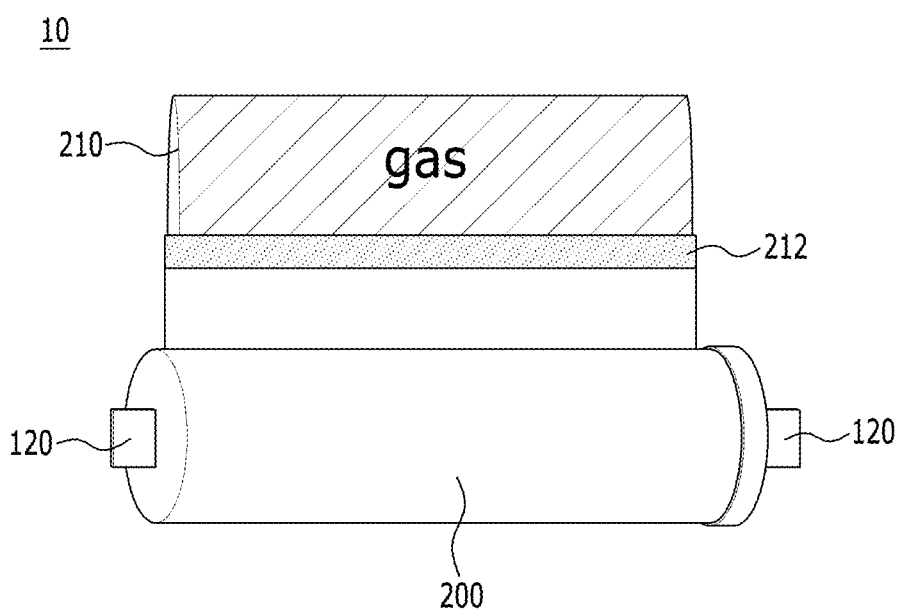
FIG. 10 is a view showing a state of a sealing part formed in a gas collecting part according to one embodiment of the present disclosure.
Figure 11:
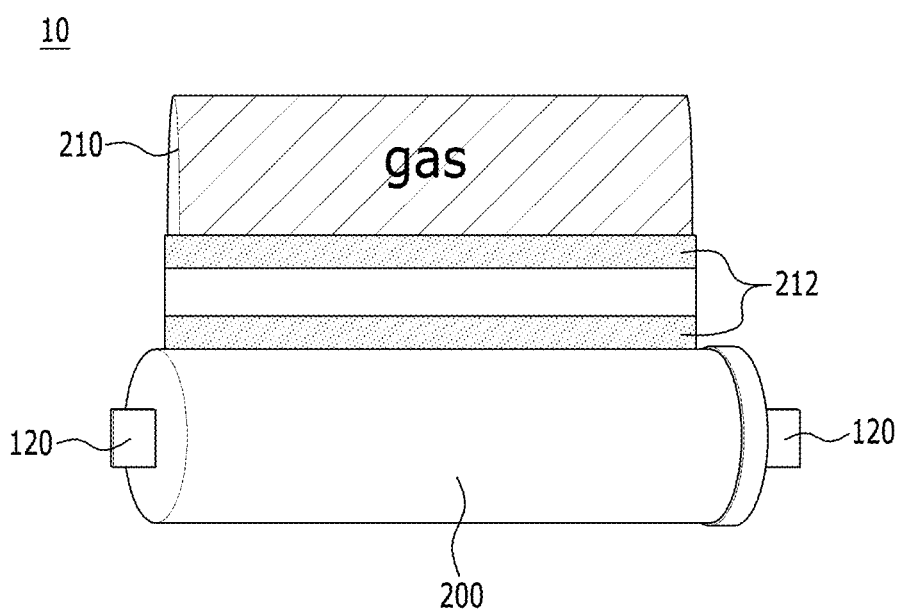
FIG. 11 is a view showing a state of a sealing part formed in a gas collecting part according to another embodiment of the present disclosure.

FIG. 10 is a view showing a state of the sealing part formed in the gas collecting part according to one embodiment of the present disclosure, and FIG. 11 is a view showing a state of the sealing part formed in the gas collecting part according to another embodiment of the present disclosure.

According to one embodiment, as shown in FIG. 10, the sealing part 212 for sealing the gas collected in the gas collecting part 210 is disposed at a portion where the gas collecting part 210 and the cylindrical pouch case are connected, and in parallel with the interface where they are connected, and, thus, can prevent the gas collected in the gas collecting part 210 from returning to the cylindrical pouch case again.

In addition, according to another embodiment, the sealing part 212 may have a dual sealing structure as shown in FIG. 11. In this case, the gas collected in the gas collecting part 210 is doubly sealed so as not to leak gas into the cylindrical pouch case, thereby preventing deformation of the battery cell.

Figure 12:
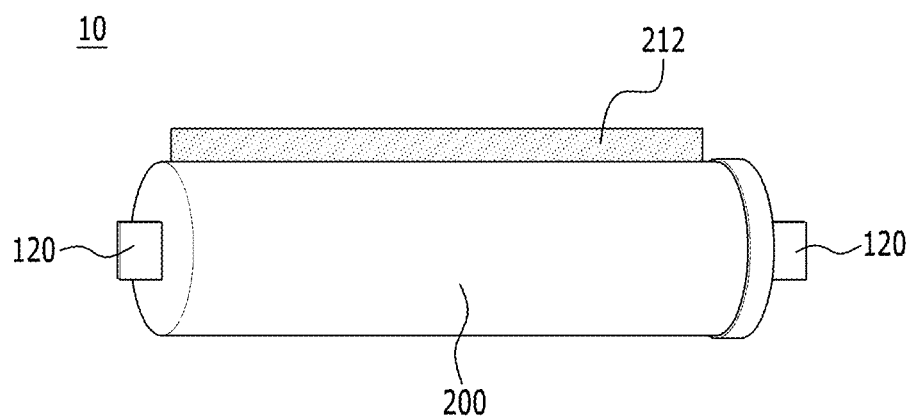
FIG. 12 is a view showing a state of a cylindrical pouch case from which a gas collecting part according to one embodiment of the present disclosure is separated.

FIG. 12 is a view showing a state which the gas collecting part according to one embodiment of the present disclosure is separated.

FIG. 12 shows a state which the gas collecting part 210 is separated from the cylindrical pouch case. That is, in the present disclosure, gas is collected through the gas collecting part 210 as shown in FIG. 9, and as shown in FIG. 10 or 11, the gas collected in the gas collecting part 210 is sealed through the sealing part 212 to thereby seal the gas collected in the gas collecting part 210 so as not to leak in the direction of the cylindrical pouch case, and then, the gas collecting part 210 in which gas was collected is cut in a direction parallel to the sealing part 212 with the sealing part 212 as a boundary, and finally, the gas collecting part 210 may be separated from the cylindrical pouch case as shown in FIG. 12.

In addition, a cylindrical battery according to one embodiment of the present disclosure comprises an electrode assembly, a cylindrical pouch case, an electrode tab protruding to an upper end of the electrode assembly, and an electrode lead welded and electrically connected to the electrode tab, with the electrode tab being plural, and the cylindrical battery may be manufactured by the method comprising the steps of: disposing the plurality of electrode tabs on the electrode assembly such that the plurality of electrode tabs protrude on the upper end of the electrode assembly; winding the electrode assembly to form the electrode assembly into a cylindrical shape; connecting the electrode leads to the plurality of electrode tabs disposed on the upper end of the electrode assembly; inserting the electrode assembly into the cylindrical pouch case to produce a battery cell; connecting, to the cylindrical pouch case, a gas collecting part for collecting gas generated due to charging and discharging of the electrode; and forming a guide part for preventing deformation of the battery cell on an outer surface of the cylindrical pouch case.

As described above, the present disclosure is characterized in that when the battery cell is expanded by the gas generated due to the charging and discharging of the battery, it is possible to lower the internal pressure simultaneously while preventing the expansion of the battery cell, and that while using a plurality of electrode tabs, it is possible to connect with the electrode lead at a time, thereby lowering the resistance generated in the process of connecting the electrodes.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The invention claimed is:

1. A method for manufacturing a cylindrical battery having multiple tabs, the cylindrical battery including an electrode assembly, a cylindrical pouch case, a plurality of electrode tabs protruding at an upper end of the electrode assembly to provide the multiple tabs, and an electrode lead welded and electrically connected to the plurality of electrode tabs, the method comprising the steps of:
disposing the plurality of electrode tabs on the electrode assembly such that the plurality of electrode tabs protrude at the upper end of the electrode assembly;
winding the electrode assembly to form the electrode assembly into a cylindrical shape;
connecting the electrode lead to the plurality of electrode tabs disposed at the upper end of the electrode assembly;
inserting the electrode assembly into the cylindrical pouch case to produce a battery cell;
connecting, to the cylindrical pouch case, a gas collecting part for collecting gas generated due to charging and discharging of the electrode assembly; and
forming a guide part on an outer surface of the cylindrical pouch case to cover the cylindrical pouch case for preventing deformation of the battery cell,
wherein the guide part includes a first slit disposed on a straight line along a longitudinal direction of the cylindrical pouch case, and wherein a part of the cylindrical pouch case is drawn out through the first slit to be the gas collection part.

2. The method for manufacturing a cylindrical battery having multiple tabs according to claim 1, wherein the plurality of electrode tabs are disposed on at least one of an uncoated portion and a coated portion of the electrode assembly.

3. The method for manufacturing a cylindrical battery having multiple tabs according to claim 1, wherein the guide part further includes a second slit disposed on each of an upper end and a lower end of the cylindrical pouch case.

4. The method for manufacturing a cylindrical battery having multiple tabs according to claim 1, wherein the gas collecting part includes a sealing part for sealing the gas collected in the gas collecting part.

5. The method for manufacturing a cylindrical battery having multiple tabs according to claim 4, wherein the gas collecting part is separated from the cylindrical pouch case in parallel with the sealing part.

6. The method for manufacturing a cylindrical battery having multiple tabs according to claim 4, wherein the sealing part has a dual sealing structure.

7. The method for manufacturing a cylindrical battery having multiple tabs according to claim 1, wherein, in the step of winding the electrode assembly to form the electrode assembly into the cylindrical shape, the plurality of electrode tabs are disposed in a circular shape on the upper end of the cylindrical battery.

8. The method for manufacturing a cylindrical battery having multiple tabs according to claim 7, wherein a lower end of the electrode lead connected to the plurality of electrode tabs has a circular shape and is disposed along an inner circumference of the plurality of electrode tabs disposed in the circular shape, and portions of the lower end of the electrode lead making contact with the plurality of electrode tabs are welded to the plurality of electrode tabs.

9. The method for manufacturing a cylindrical battery having multiple tabs according to claim 8, wherein the lower end of the electrode lead having the circular shape is made by two lead portions that are disposed vertically and horizontally, respectively, to cross each other, and the two lead portions are welded at a crossed portion, and then the electrode lead portion disposed horizontally at the lower end is bent so that the lower end of the electrode lead has the circular shape.

10. The method for manufacturing a cylindrical battery having multiple tabs according to claim 8, wherein the lower end of the electrode lead having the circular shape is made by two lead portions that are integrally formed vertically and horizontally, respectively, and then the electrode lead portion disposed horizontally at the lower end is bent so that the lower end of the electrode lead has the circular shape.

11. A cylindrical battery manufactured according to the method of claim 1.

* * * * *